(12) United States Patent
Jackowski et al.

(10) Patent No.: US 8,275,711 B2
(45) Date of Patent: *Sep. 25, 2012

(54) ENFORCEMENT OF NETWORK SERVICE LEVEL AGREEMENTS

(75) Inventors: Steven J Jackowski, Santa Cruz, CA (US); Ayal Lior, Santa Cruz, CA (US)

(73) Assignees: Gilat Satellite Networks, Ltd (IL); Citrix Systems, Inc, Fort Lauderdale, FL (US)

( * ) Notice: Subject to any disclaimer, the term of this patent is extended or adjusted under 35 U.S.C. 154(b) by 234 days.

This patent is subject to a terminal disclaimer.

(21) Appl. No.: 12/899,004

(22) Filed: Oct. 6, 2010

(65) Prior Publication Data

US 2011/0029661 A1     Feb. 3, 2011

Related U.S. Application Data

(63) Continuation of application No. 10/626,629, filed on Jul. 25, 2003, now Pat. No. 7,818,252.

(60) Provisional application No. 60/448,126, filed on Feb. 20, 2003.

(51) Int. Cl.
*G06Q 40/00*     (2012.01)

(52) U.S. Cl. .......................... 705/40; 705/35

(58) Field of Classification Search .............. 705/35, 705/40

See application file for complete search history.

(56) References Cited

U.S. PATENT DOCUMENTS

| | | | |
|---|---|---|---|
| 6,658,010 | B1 | 12/2003 | Enns et al. |
| 7,113,497 | B2 | 9/2006 | Cromer et al. |
| 2002/0095400 | A1 | 7/2002 | Johnson et al. |
| 2003/0027549 | A1 | 2/2003 | Kiel et al. |
| 2003/0108095 | A1 | 6/2003 | Duvaut et al. |

OTHER PUBLICATIONS

Australian Investment Company Signs with USVO for StreamHQ Services Business/Technology Editors, Business Wire, New York; Jun. 19, 2001, p. 1.
USA Video Interactive CEO Describes Future of Internet Movies as Kagan VOD Summit Conference in NYC, Business Editors, Business Wire, New York; Oct. 25, 2000, p. 1.
Accommodating Advanced Services Through Convergence, Robert Lau, Business Times, Kuala Lumpur, Aug. 9, 2000, p. 5.
Web connections you can adjust Money saver? Intelli-Space's adjustable bandwidth allows a company to raise or lower its Internet connection throughput, depending on the task at hand. Stacey Hirsh, The Baltimore Sun, Maryland; Jan. 6, 2001, p. 10.C.
http://www.deterministicnetworks.com/products/NJQoS.asp.
http://www.deterministicnetworks.com/Products/njqos_mgt.asp.
http://www.deterministicnetworks.com/Press/Ositis_Release.asp.

*Primary Examiner* — Lalita M Hamilton
(74) *Attorney, Agent, or Firm* — Banner & Witcoff, Ltd

(57) ABSTRACT

A service level agreement may be imposed by a service provider, such as an Internet service provider, that may include, e.g., a volume limitation and a bandwidth limitation. One or more limitations of the service level agreement may be enforced or modified in response to a triggering event. For example, a bandwidth limitation on a network subscriber may be enforced or modified based on how much data is consumed by the subscriber.

20 Claims, 3 Drawing Sheets

| | |
|---|---|
| Customer ID | Access point identifier (customer number) |
| Access Point | 10.10.1.1/255.255.255.255 |

| | |
|---|---|
| From Access Point | Used - 200 MB<br>Level 1 - 300 MB<br>Level 2 - 500 MB<br><br>Last 4 hours -<br>Used 1.5 of 15 MB |
| To Access Point | Used - 7.5 GB<br>Level 1 - Used 7.5 of 5 GB<br>Level 2 - Used 7.5 of 7 GB<br><br>Last 4 hours -<br>Used 100 of 150 MB |

Your quota was last reset on December 18, 2002 at 01:00:00 PST
Your quota will be reset on December 25, 2002 at 01:00:00 PST STATUS: This account has exceeded its quota and is being regulated.

| Time | Access Pt. | Group | Channel | Exceeded Quota |
|---|---|---|---|---|
| 12/25/2002 12:02:45 | 10.10.1.1 | Silver | Channel 1 | Level 1 (5 GB) |
| 12/25/2002 12:05:45 | 10.10.1.4 | Gold | Channel 1 | Level 2 (13 GB) |
| 12/25/2002 12:09:12 | 10.10.2.1 | Gold | Channel 1 | Level 1 (10 GB) |
| 12/25/2002 12:09:12 | 10.10.2.1 | Gold | Channel 1 | Level 1 (10 GB) |
| 12/25/2002 12:09:12 | 10.10.2.1 | Silver | Channel 1 | Level 2 (7 GB) |
| 12/25/2002 12:09:12 | 10.10.2.1 | Silver | Channel 1 | Level 1 (5 GB) |
| 12/25/2002 12:09:12 | 10.10.2.1 | Gold | Channel 1 | Level 1 (10 GB) |
| 12/25/2002 12:09:12 | 10.10.2.1 | Gold | Channel 1 | Level 1 (10 GB) |
| 12/25/2002 12:09:12 | 10.10.2.1 | Silver | Channel 1 | Level 1 (5 GB) |
| 12/25/2002 12:09:12 | 10.10.2.1 | Gold | Channel 1 | Level 1 (10 GB) |
| 12/25/2002 12:09:12 | 10.10.2.1 | Silver | Channel 1 | Level 1 (5 GB) |
| 12/25/2002 12:09:12 | 10.10.2.1 | Silver | Channel 1 | Level 1 (5 GB) |
| 12/25/2002 12:09:12 | 10.10.2.1 | Silver | Channel 1 | Level 1 (5 GB) |
| 12/25/2002 12:09:12 | 10.10.2.1 | Gold | Channel 1 | Level 1 (10 GB) |
| 12/25/2002 12:09:12 | 10.10.2.1 | Silver | Channel 1 | Level 1 (5 GB) |
| 12/25/2002 12:09:12 | 10.10.2.1 | Silver | Channel 1 | Level 1 (5 GB) |
| 12/25/2002 12:09:12 | 10.10.2.1 | Silver | Channel 1 | Level 2 (7 GB) |

ENFORCEMENT OF NETWORK SERVICE LEVEL AGREEMENTS

CROSS-REFERENCE TO RELATED APPLICATIONS

The present application is a continuation of U.S. nonprovisional patent application Ser. No. 10/626,629, entitled "Enforcement of Network Service Level Agreements," filed Jul. 25, 2003, which claims priority to U.S. provisional patent application Ser. No. 60/448,126, entitled "Enforcement of Network Service Level Agreements," filed Feb. 20, 2003, the contents of both of which are incorporated herein by reference.

FIELD OF THE INVENTION

Aspects of the present invention are directed generally to methods and apparatuses for enforcing network service level agreements.

BACKGROUND

A common phenomenon in networks such as Internet networks is that a large portion of bandwidth is consumed by a small group of network subscribers. For instance, it is not unusual for 25% to 40% of network bandwidth to be used by only a few percent of the subscribers. Often, a disproportionately large percentage of the network capacity is consumed by relatively few of the subscribers to a network. For instance, it is not uncommon that as little as 2% of the network's population may consume 40% of the total network bandwidth or more.

Such uneven usage can be detrimental, bringing the network into congestion and degrading the service for the entire network population, often much sooner than projected. This phenomenon also puts the business model for the service at risk. ISPs have tried various types of service level agreements (SLAs) in order to limit the amount of data that a subscriber accesses via the network. However, such SLAs have proved to be ineffective, irritating to the subscriber, or both. There is therefore a need to affect the way subscribers consume network bandwidth in a manner that is fairer to the network population of subscribers, and in a manner that is more appealing to high bandwidth subscribers.

SUMMARY OF THE INVENTION

Embodiments of the present invention may include one or more aspects as described herein. For example, an aspect of the present invention is directed to a service level agreement (SLA) imposed by a service provider, such as an Internet service provider (ISP), that may include both a volume limitation and a bandwidth limitation. Alternatively or additionally, the SLA may include both a volume limitation and another limitation such as a priority level adjustment. One or more limitations of the SLA may be enforced in response to a triggering event. A potential result is that ISP revenues may be increased while bandwidth costs may be lowered.

According to another aspect of the present invention, each subscriber may have their own account for tracking how much data the subscriber has consumed using the network. The account may initially be assigned one or more balances equal to a quota. As the subscriber consumes data, the balance(s) in the account may be reduced in accordance with the volume of data consumed. There may be different quotas and balances per direction (i.e., an upstream quota and an upstream balance that tracks upstream consumption from the subscriber, and a downstream quota and a downstream balance that tracks downstream consumption to the subscriber).

According to yet another aspect of the present invention, a subscriber's account may gain positive credit over time. The subscriber's account balances may gain positive credit on a periodic basis such as a daily, weekly, or monthly basis, or continuously over time. For instance, an account balance may be replenished back to an initial short-term quota once per week, and thus is credited by an amount that depends upon that balance. The subscriber's current balance may also be added to whatever amount the balance is replenished by. This may allow a subscriber to carry over unused portions of quotas from previous periods into the current period. One or more (e.g., two) "long term" quotas per subscriber may further be used, allowing different levels of throttling based on the subscriber's account balance(s).

In accordance with yet another aspect of the present invention, the SLA may include one or more limitations that affect the amount of traffic that can be burst during relatively short time periods. The subscriber may be limited to consuming up to a predetermined amount of data over any window of time. Burst size may further be limited at peak usage times to protect the network from being overloaded.

In accordance with yet another aspect of the present invention, subscribers may remotely log in (e.g., via a web interface through the Internet) to check their accounts and/or to modify their service level agreements. For instance, a subscriber may decide to purchase more bandwidth and therefore pay accordingly to the subscriber's bandwidth needs. Thus, the service provider may realize higher revenues as bandwidth usage grows, allowing the cost of infrastructure upgrades to be more easily covered while more efficiently utilizing existing infrastructure. The service provider may further remotely log in (e.g., also via a web interface through the Internet) to the subscriber's account and other accounts.

Aspects of the present invention may be used in conjunction with, and/or may modify, any quality of service (QoS) solution, and may be used in various environments, such as but not limited to a shared hub environment. Also, aspects of the invention may support variable rates depending upon time of day, day of week, and/or another measure of time (e.g., peak time, off peak, weekends), such that the expected network load determines the cost of data. For example, the cost of each Mbyte may be determined by such a variable rate. Aspects of the invention may further be hugely scalable. For instance, aspects of the invention may support up to 1 Gbps or faster, and 100,000 subscribers or more.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 3 is an illustrative screenshot from an account access web page accessible by a subscriber in accordance with at least one aspect of the present invention.

FIG. 4 is an illustrative screenshot from an operator interface in accordance with at least one aspect of the present invention.

DETAILED DESCRIPTION OF ILLUSTRATIVE EMBODIMENTS

Figure 1:
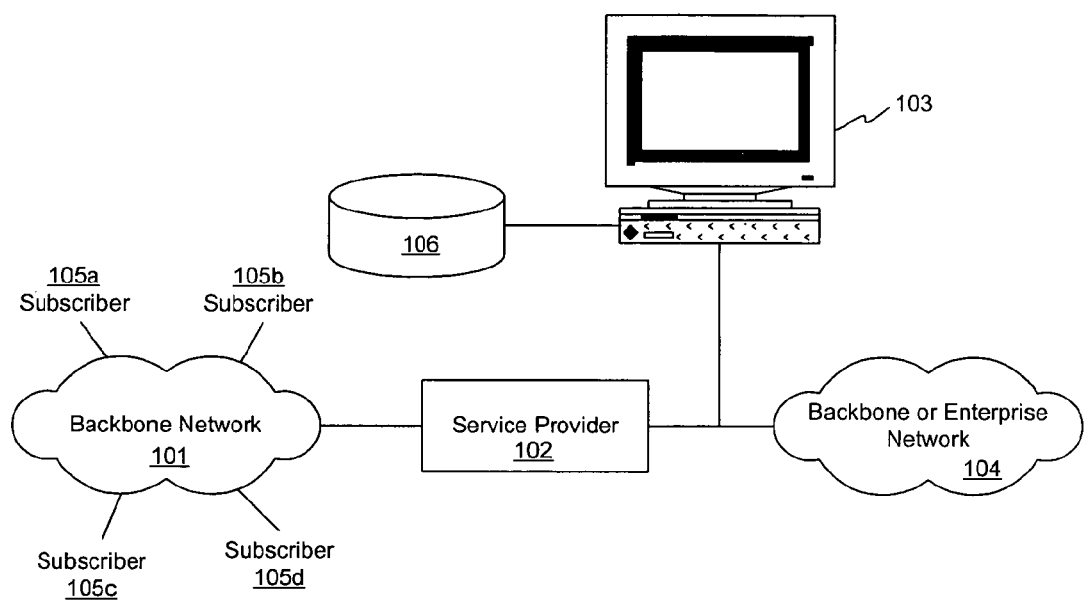
FIG. 1 is a functional block diagram of an illustrative embodiment of a network and apparatus to enforce service level agreements in accordance with at least one aspect of the present invention.

Referring to FIG. 1, a network 101 may be coupled to one or more service providers 102. The network may be any network or collection of networks such as the Internet, a local area network (LAN), a wide area network (WAN), a wireless network, and/or any other type of network. The service provider 102 may provide network service through the network 101 to a plurality of network subscribers 105a-105d. A subscriber may include one or more users. For instance, a subscriber may be an individual user or a subscriber may be an office with one hundred users utilizing one or more connections to the network 101. Although four subscribers are shown in FIG. 1, any number of subscribers may utilize the network 101. The service provider 102 may further have or be coupled to an enterprise network 104 and/or a local or remote management computer 103.

Each of the subscribers 105a-105d may consume data over the network 101. In other words, each of the subscribers 105a-105d may transmit and/or receive data over the network 101. In consuming data, each subscriber requires a certain bandwidth of access to the network 101. The bandwidth is the amount of data consumed by a subscriber per unit of time. For example, if a subscriber downloads 6 MB of data over the span of one minute, then the subscriber has utilized an average download bandwidth during that minute of 100 KB per second. If a subscriber uploads 3 MB of data over the span of one minute, then that subscriber has utilized an average upload bandwidth during that minute of 50 kB per second.

The amount of bandwidth utilized by a subscriber at any given time depends on a variety of factors. For example, the bandwidth may be affected by the speed of the subscriber's connection (e.g., dial-up 56 k modem versus cable modem), the maximum speed of the network 101, the number of subscribers currently using the network 101, the path that data takes through the network 101, and/or any service level agreements (SLAs) imposed upon the subscriber.

An SLA includes one or more limitations imposed upon a subscriber's use of a network. Such limitations may include, but are not necessarily limited to, a data bandwidth limitation and/or a data volume limitation. A data bandwidth limitation limits the amount of bandwidth that may be consumed by the subscriber, and a volume limitation limits the total amount of data that may be consumed by the subscriber. Each subscriber may have his or her own SLA, which may be different from or the same as the SLAs for other subscribers. For instance, a first SLA may limit the subscriber 105a with a maximum upload (i.e., upstream from the subscriber to the service provider) bandwidth of 10 MB per minute and a maximum download (i.e., downstream from the service provider to the subscriber) bandwidth of 15 MB per minute. A second SLA may limit the subscriber 105b with a maximum upload bandwidth of 7 MB per minute and a maximum download bandwidth of 10 MB per minute. A third SLA may be configured such that, over any given four hour window of time, the subscriber 105c is limited to downloading no more than 1 GB and uploading no more than 300 Mbytes.

An SLA may further have one or more limitations that are enabled, disabled, altered, or otherwise affected in response to one or more factors. Examples of such factors include a subscriber consuming more or less than a certain amount of data over a certain period of time, a subscriber utilizing more or less than a certain amount of bandwidth, the time of day, the date, the day of week, the number of subscribers of the network 101 being more or less than a certain number of subscribers, the current network congestion level, and/or other factors. For example, under their respective SLAs, each of the subscribers 105a-105d may be entitled to consume up to a predetermined quota of data over the network 101, and each subscriber 105a-105d may have an individual quota assigned to that subscriber. Responsive to the predetermined quota having been exhausted, a bandwidth limitation on that subscriber may begin to be enforced or an existing bandwidth limitation may be altered. For instance, a bandwidth limitation may be altered by decreasing the maximum allowed bandwidth to a smaller bandwidth that is greater than zero, thus making the bandwidth limitation stricter.

Referring back to FIG. 1, the management computer 103 may be any computer or collection of computers such as a server, desktop personal computer, and/or laptop computer. The management computer 103 may further include or be coupled to a storage device 106. The storage device 106 may be any storage device or collection of storage devices such as a memory, a hard drive, a disk drive, a tape drive, and/or an optical drive. The storage device 106 may be organized in any data format(s) and may include data organized as one or more databases, tables, text files, and/or any other format. Data stored in the storage device 106 may represent one or more account balances for each of some or all of the subscribers 105a-105d, and/or for one or more groups of the subscribers 105a-105d. The account balances may keep track of how much data is consumed by the respective subscriber or group of subscribers. The account balances may further be used to trigger changes in SLA limitations. Each subscriber may have one or more of the accounts associated with the subscriber's SLA. For instance, the subscriber 105a may have a downstream account for tracking the amount of data downloaded and/or an upstream account for tracking the amount of data uploaded. The downstream and upstream accounts may be in separate accounts or embodied as a single account having both a downstream balance and an upstream balance. Other types of balances that may be used include a burst balance, which tracks how much burst data is consumed by the subscriber.

Figure 2:
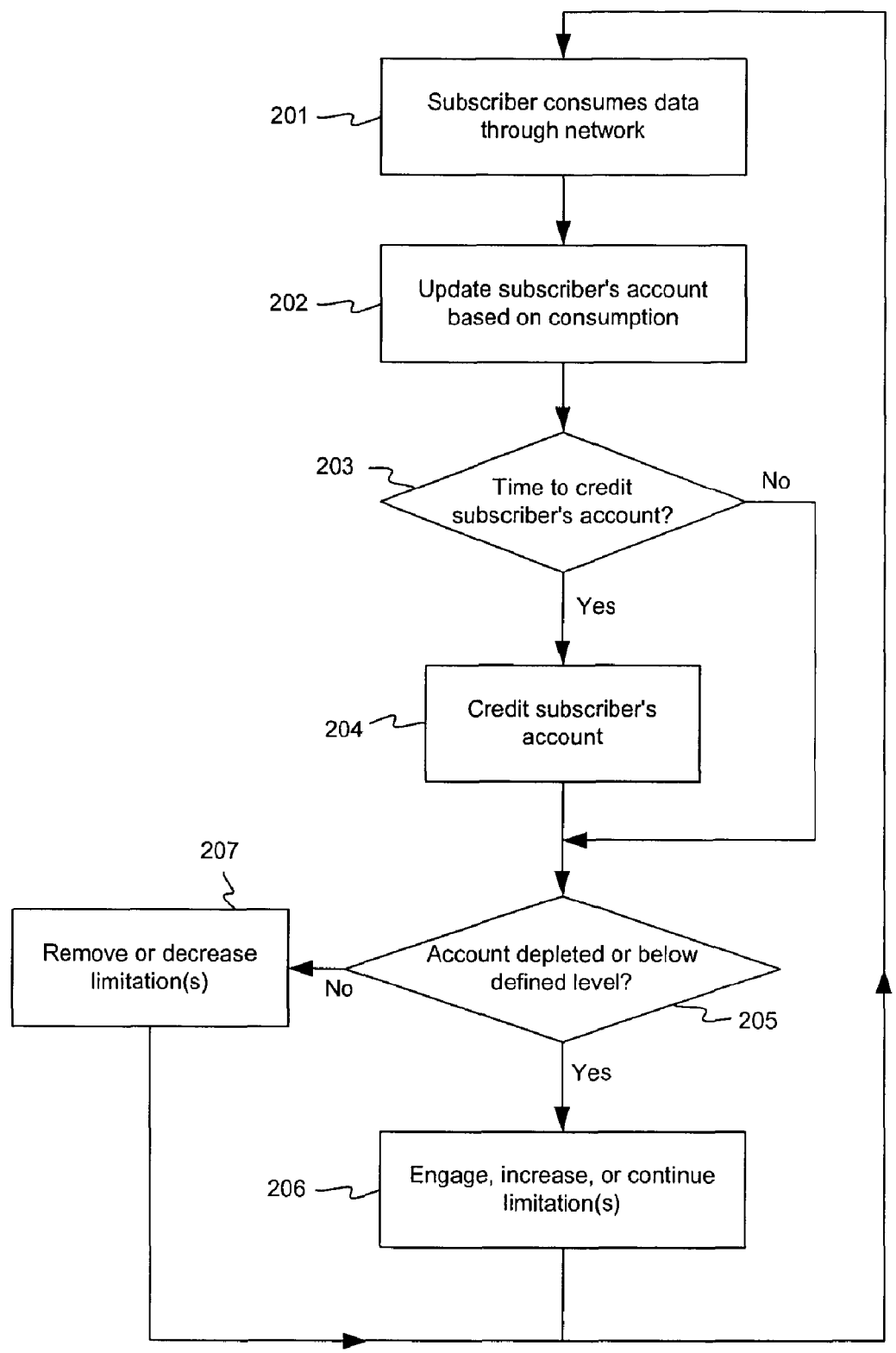
FIG. 2 is a flowchart showing illustrative steps that may be taken in accordance with at least one aspect of the present invention.

An illustrative operation of how SLA limitations may be affected is shown in the flowchart of FIG. 2. According to the flowchart, a subscriber may be consuming data over the network 101 (step 201). The subscriber's account (which may be stored at, e.g., the storage device 106) may be updated to reflect the amount of data consumed (step 202). For instance, assume that the subscriber has an initial downstream account balance of 10 GB and an initial upstream balance of 1 GB. If the subscriber downloads 2 MB of data, then the downstream balance of the subscriber's account may be decremented by 2 MB to result in a downstream balance of 9.998 GB. Or, where the subscriber uploads 2 MB of data, the upstream balance of the subscriber's account may be decremented by 2 MB to result in an upstream balance of 0.998 GB.

The subscriber's account may be occasionally credited in accordance with the subscriber's SLA. The credit may occur periodically, intermittently, or continuously, and/or may be triggered by one or more events. Examples of events that may trigger a credit are a change of service level, payment of a service bill that is due or overdue, and/or any other event. Where the credit occurs periodically, such a credit may occur, say, once per day, once per week, once per month, or with any other intervening periods of time. The credit may be a fixed amount or may vary. Where the credited amount varies, the credited amount may depend upon one or more factors such as the current balance of the account, the service level of the subscribers, a credit amount limit, the subscriber's data bandwidth and/or data volume usage history, and/or any other factor. Further, the account may be credited with whatever amount is necessary to bring the account balance to a predetermined level. Where the latter occurs, the amount credited may be limited to be no more than a predetermined credit amount.

Thus, it may be determined whether it is appropriate to credit the subscriber's account at a particular time (step 203), and if so, the account is credited (step 204). The steps of determining 203 and/or crediting 204 may be performed by the management computer. 103 and/or by another device. Whether it is appropriate to credit an account may depend upon the frequency that credits are performed (e.g., weekly or monthly), whether the subscriber is current on any bills that are due, and/or any other factor. For example, if the subscriber's account is to be credited once per month, and it is now time for such a credit, then the subscriber's account may be credited accordingly. In the above example, the subscriber's account may be credited by a fixed amount, e.g., by 10 GB each month into the download account and/or by 1 GB into the upload account. Alternatively, the accounts may be credited by a varying credit amount such that the download account is credited with whatever amount is necessary to bring the balance up to, e.g., 10 GB, and where the upload account is credited with whatever amount is necessary to bring the balance up to, e.g., 1 GB. These factors may be determined by rules defined by the subscriber's SLA.

The subscriber's account(s) may be checked to determine whether it is depleted or below a defined level (e.g., an account balance of zero or less, or an account balance of 100 MB or less) (step 205). Such checking may be performed by the management computer 103 and/or by another device. If not, then previously-imposed limitations (e.g., bandwidth limitations and/or volume limitations), if any, may be released or altered to be less strict (step 207). For instance, if a previously-imposed limitation limits the amount of downloading bandwidth of the subscriber 105a to 2 MB per hour, that limitation may be partially or fully lifted, such that, for instance, there is no bandwidth limitation or the bandwidth limitation is now, e.g., 1 GB per hour. If the account balance becomes depleted, then previously-imposed limitations may be altered to be more strict, and/or new limitations may be imposed (step 206). For instance, if there were previously no bandwidth (and/or volume) limitation, then a bandwidth (or volume) limitation may be imposed. Or, for instance, where a bandwidth (and/or volume) limitation is currently being imposed, that limitation may be altered so as to lower the amount of bandwidth (and/or volume) available to the subscriber.

Although steps in FIG. 2 are shown and discussed in a particular illustrative order, the particular order is not essential, and other orders of performing steps are within the scope of the present discussion. For instance, steps 203 and 204 are shown to occur after step 202, however these steps may occur before or after other steps. For example, steps 203 and 204 may occur immediately after step 201 or immediately after other steps. Also, not all steps are essential.

Subscriber View

Each subscriber may log on to a computer, which may be located at or near the service provider 102 (such as the management computer 103), through a network connection to see his or her account balance(s) and/or other information pertaining to the subscriber's account(s). For example, FIG. 3 shows an example of a screenshot 300 of a user interface that a subscriber may use via an Internet browser over an Internet connection. The screenshot 300 shows the subscriber how much of the subscriber's quota has been used and/or the subscriber's status. For example, the screenshot 300 shows that the subscriber's account is being regulated. This may mean that a limitation has been imposed or made stricter in response to exceeding a quota. The screenshot further shows the subscriber's bandwidth consumption in both upstream and downstream traffic directions.

To access a user interface showing the subscriber's account information, the subscriber may locally have at the subscriber's computer a software application such as an Internet browser. Where the account information is accessed over a network other than the Internet, the subscriber's computer may have a software application configured to communicate with a computer such as the management computer 103 over the network to obtain account information and display the user interface 300.

Operator View

A user interface may further provide a network operator (e.g., located at or near the service provider 102, such as at the management computer 103) information about subscribers' accounts. For example, referring to the illustrative screenshot 400 of FIG. 4, the network operator may view one or more log files showing which, how, and/or when subscribers' accounts are being regulated. The user interface provided to the network operator may also be obtain via an Internet browser and/or other type of network-compatible application. An email may further be sent to the network operator indicating this same information. Valuable reports may further be readily available to show the network operator how many subscribers are being regulated and/or to identify usage trends.

While exemplary systems and methods as described herein embodying various aspects of the present invention are shown by way of example, it will be understood that the invention is not limited to these embodiments. Modifications may be made by those skilled in the art, particularly in light of the foregoing teachings. For example, each of the elements of the aforementioned embodiments may be utilized alone or in combination with elements of the other embodiments. In addition, the invention has been defined using the appended claims, however these claims are exemplary in that the invention is intended to include the elements and steps described herein in any combination or sub combination. It will also be appreciated and understood that modifications may be made without departing from the true spirit and scope of the invention.

What is claimed is:

1. A computer implemented method for regulating data consumption in a network, comprising the steps of:

storing by a first computer an account in a computer memory for each of a plurality of users of the network, each account comprising data corresponding to at least one of an upstream network usage balance or a downstream network usage balance;

determining at least one network usage amount for a first user in the plurality of users;

based on the at least one determined network usage amount, comparing at least one of the upstream network usage balance or the downstream network usage balance for a first account associated with the first user to a predefined usage level; and when either the upstream network usage balance or the downstream network usage balance for the first account drops below the predefined usage level, imposing a more restrictive bandwidth on the continuing network usage of the first user.

2. The method of claim 1, further comprising:
crediting by the first computer at least one of the upstream network usage balance or the downstream network usage balance of first account in the computer memory on an intermittent basis.

3. The method of claim 1, further comprising:
reducing at least one of the upstream network usage balance or the downstream network usage balance of the first account by an amount based upon a volume of network data consumption by the first user.

4. The method of claim 1, wherein the more restrictive bandwidth imposed on the user depends upon at least one of a time of day and a current network congestion level.

5. The method of claim 1, wherein at least one of the upstream network usage balance or the downstream network usage balance for the first account comprises a burst balance.

6. The method of claim 1, wherein each of the plurality of users has its own predefined usage level stored in the memory of the first computer.

7. The method of claim 1, wherein when either the upstream network usage balance or the downstream network usage balance for the first account rises above a second predefined usage level, imposing a less restrictive bandwidth on the continuing network usage of the first user.

8. A computer implemented method for regulating data consumption in a network, comprising the steps of:
storing by a first computer an account in a computer memory for each of a plurality of users of the network, each account comprising data corresponding to at least one of an upstream network usage balance or a downstream network usage balance;
determining at least one network usage amount for a first user in the plurality of users;
based on the at least one determined network usage amount, comparing at least one of the upstream network usage balance or the downstream network usage balance for a first account associated with the first user to a predefined usage level; and
when either the upstream network usage balance or the downstream network usage balance for the first account rises above the predefined usage level, imposing a less restrictive bandwidth on the continuing network usage of the first user.

9. The method of claim 8, further comprising:
crediting by the first computer at least one of the upstream network usage balance or the downstream network usage balance of first account in the computer memory on an intermittent basis.

10. The method of claim 8, further comprising:
reducing at least one of the upstream network usage balance or the downstream network usage balance of the first account by an amount based upon a volume of network data consumption by the first user.

11. The method of claim 8, wherein the less restrictive bandwidth imposed on the user depends upon at least one of a time of day and a current network congestion level.

12. The method of claim 8, wherein at least one of the upstream network usage balance or the downstream network usage balance for the first account comprises a burst balance.

13. The method of claim 8, wherein each of the plurality of users has its own predefined usage level stored in the memory of the first computer.

14. An apparatus, comprising:
at least one processor; and
one or more computer-readable media storing computer-executable instructions that, when executed by the processor, cause the apparatus to perform:
storing an account for each of a plurality of users of a network, each account comprising data corresponding to at least one of an upstream network usage balance or a downstream network usage balance;
determining at least one network usage amount for a first user in the plurality of users;
based on the at least one determined network usage amount, comparing at least one of the upstream network usage balance or the downstream network usage balance for a first account associated with the first user to a predefined usage level; and
when either the upstream network usage balance or the downstream network usage balance for the first account drops below the predefined usage level, imposing a more restrictive bandwidth on the continuing network usage of the first user.

15. The apparatus of claim 14, wherein the computer-executable instructions, when executed by the processor, further cause the apparatus to perform:
crediting at least one of the upstream network usage balance or the downstream network usage balance of first account on an intermittent basis.

16. The apparatus of claim 14, wherein the computer-executable instructions, when executed by the processor, further cause the apparatus to perform:
reducing at least one of the upstream network usage balance or the downstream network usage balance of the first account by an amount based upon a volume of network data consumption by the first user.

17. The apparatus of claim 14, wherein the more restrictive bandwidth imposed on the user depends upon at least one of a time of day and a current network congestion level.

18. The apparatus of claim 14, wherein at least one of the upstream network usage balance or the downstream network usage balance for the first account comprises a burst balance.

19. The apparatus of claim 14, wherein each of the plurality of users has its own predefined usage level.

20. The apparatus of claim 14, wherein when either the upstream network usage balance or the downstream network usage balance for the first account rises above a second predefined usage level, imposing a less restrictive bandwidth on the continuing network usage of the first user.

* * * * *